United States Patent [19]

Sakuma et al.

[11] Patent Number: 4,580,415
[45] Date of Patent: Apr. 8, 1986

[54] DUAL REFRIGERANT COOLING SYSTEM

[75] Inventors: Kiyoshi Sakuma; Yoshiaki Tanimura, both of Ozika Shizuoka; Naoki Tanaka, Amagasaki, all of Japan

[73] Assignee: Mitsubishi Denki Kabushiki Kaisha, Tokyo, Japan

[21] Appl. No.: 588,011

[22] Filed: Mar. 9, 1984

[30] Foreign Application Priority Data

Apr. 24, 1983 [JP] Japan .................. 58-70953
Apr. 24, 1983 [JP] Japan .................. 58-70954
Apr. 24, 1983 [JP] Japan .................. 58-70955

[51] Int. Cl.$^4$ ............................................. F25B 1/00
[52] U.S. Cl. ...................................... 62/502; 62/512
[58] Field of Search ............... 62/114, 502, 504, 511, 62/527, 512

[56] References Cited

U.S. PATENT DOCUMENTS

| | | | |
|---|---|---|---|
| 1,866,526 | 7/1932 | Davenport | 62/502 |
| 2,794,322 | 6/1957 | Etherington | 62/502 |
| 2,794,328 | 6/1957 | Herrick | 62/502 |
| 2,841,965 | 7/1958 | Etherington | 62/502 |
| 2,867,094 | 1/1959 | Herrick | 62/502 |
| 3,203,194 | 8/1965 | Fuderer | 62/502 |
| 3,487,653 | 1/1970 | Myre | 62/502 |
| 4,393,661 | 7/1983 | Vakil | 62/114 |
| 4,406,134 | 9/1983 | Vakil | 62/114 |
| 4,423,603 | 1/1984 | Oguni et al. | 62/502 |

Primary Examiner—Ronald C. Capossela
Attorney, Agent, or Firm—Sughrue, Mion, Zinn, Macpeak and Seas

[57] ABSTRACT

A refrigeration cycle system includes a compressor 1, a condenser 2, an expansion device 3 and an evaporator 5 connected in series with each other, and charged with a heteroazeotropic refrigerant mixture comprising R12 and R13. A fractionating vessel 6 and an electromagnetic valve 7 are provided in predetermined portions of the system for separating the R12 and R13 refrigerant components during an ordinary freezing mode and for mixing them during a rapid freezing mode.

6 Claims, 22 Drawing Figures

DUAL REFRIGERANT COOLING SYSTEM

BACKGROUND OF THE INVENTION

The present invention relates to a novel refrigeration cycle system usable in a rapid freezing refrigerator, for example.

A conventional refrigeration cycle system is shown in FIG. 1, in which a compressor 1, a condenser 2, first and second expansion devices 3a, 3b such as capillary tubes, an electromagnetic valve 4 connected in parallel with the first expansion device, and an evaporator 5 are coupled to each other in a series circuit. A single refrigerant, for example, $CCl_2F_2$ (di-chloro di-fluoro methane) or "R12", whose boiling points is $-22°$ F., is charged into the system, and circulates in the direction of the arrows.

A rapid freezing refrigerator must provide two freezing or refrigerating modes, a super-low temperature mode ($-40°$ F.$--58°$ F.) at the time of rapid freezing and a normal low temperature mode ($5°$ F.$--4°$ F.) at the time of ordinary freezing.

In the ordinary freezing mode the valve 4 is open, and the refrigerant gas brought to a high temperature and pressure state by the compressor 1 is first cooled and liquefied in the condenser 2. Such liquid thereafter flows through the second expansion device 3b via the valve 4, bypassing the first expansion device 3a, whereby it is brought to a low temperature and pressure state. The liquefied refrigerant is then fed through the evaporator 5 and gasified therein, and the refrigerant gas from the evaporator is finally returned to the compressor. Such ordinary freezing at a relatively high temperature ($5°$ F.$--4°$ F.) is performed endothermically in the evaporator 5.

In the rapid freezing mode the electromagnetic valve 4 is closed and the high temperature and pressure refrigerant gas from the compressor is cooled and liquefied in the condenser 2 in the same manner as above. Subsequently, the liquid refrigerant flows through both the first and second expansion devices 3a, 3b in which lower temperature and pressure states than before are obtained, whereafter rapid freezing to a super-low temperature ($-40°$ F.$--58°$ F.) is implemented in the evaporator 5.

Thus, in the conventional refrigeration cycle system the switching between the ordinary and rapid freezing modes is easily performed by opening and closing the electromagnetic valve 4. There is a general tendency in such a system, however, for the refrigerant pressure to decrease in proportion to the lowering of temperature, with the result that the refrigerating power will be lowered. Consequently, since a single fluid such as a pure refrigerant or an azeotropic refrigerant mixture is used in the conventional system, if it is selected to be most suitable for the ordinary freezing mode, for example, it lacks refrigerating power during the rapid freezing mode, and vice versa.

SUMMARY OF THE INVENTION

Accordingly, a primary object of the invention is to provide a new refrigeration cycle system in which the defects pointed out in the conventional system are effectively eliminated. Another object of the invention is to provide a refrigeration cycle system which is able to ensure a high refrigerating power over a wide temperature range, which has a high cooling efficiency, and which is easy to manufacture.

These objects are realized by employing a heteroazeotropic refrigerant mixture of high and low boiling point components, and by providing means in the form of a fractionating vessel for selectively mixing and separating such components, respectively, during rapid and ordinary freezing modes.

DETAILED DESCRIPTION OF THE PREFERRED EMBODIMENTS

Figure 1:
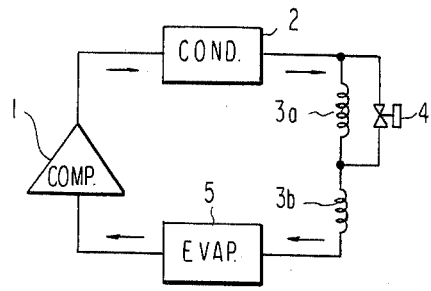
FIG. 1 is a schematic diagram of a conventional refrigeration cycle system.
Figure 2:
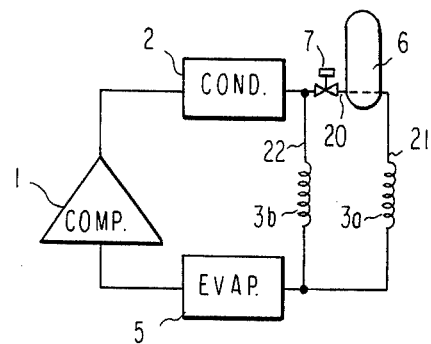
FIG. 2 is a schematic diagram of a first embodiment of the system of this invention.

Reference is now made to the drawings, particularly to FIG. 2 showing a first embodiment of a refrigeration cycle system according to the invention. In FIG. 2, reference numerals 3a and 3b designate first and second expansion devices connected in parallel with each other, and reference numeral 6 designates a refrigerant vessel which is provided at the outlet side of the condenser 2. A pipe 20 extending from an electromagnetic valve 7 into the vessel 6 at a lower part thereof terminates within the vessel, and the refrigerant leaving the vessel flows out via a pipe 21. A branch pipe 22 connects the outlet side of the condenser 2 to the inlet side of the evaporator 5 through the second expansion device 3b.

In this refrigeration cycle system a heteroazeotropic refrigerant mixture is used which comprises R12 as described above having a relatively high boiling point of $-22°$ F., and R13 ($CClF_3$-mono-chloro tri-fluoro methane) having a relatively low boiling point of $-114°$ F.

In operation in a rapid freezing mode (a super-low temperature) the valve 7 is closed, and consequently all of the heteroazeotropic refrigerant mixture flows from the compressor 1 through the condenser 2 and the second expansion device 3b to the evaporator 5. Due to the very low boiling point of R13 ($-114°$ F.), the evaporation of the refrigerant in the evaporator 5 produces the desired super-low temperature with a relatively high evaporation pressure.

When the electromagnetic valve 7 is opened in the ordinary freezing mode, the heteroazeotropic refrigerant mixture is compressed and condensed as described above, but both a liquid refrigerant component primarily composed of R12 and a gaseous refrigerant component primarily composed of R13 co-exist in the condenser 2 because of the difference between the condensation temperatures of R12 and R13. Consequently, once a part of the refrigerant from the condenser flows into the refrigerant vessel 6, the gaseous component is retained in the upper part of the vessel and only the liquid refrigerant component flows into the first expansion device 3a in which its pressure is reduced. The refrigerant from the device 3a is subsequently returned to the compressor 1 through the evaporator 5.

With the repetition or continuation of this cycle, substantially only the R12 refrigerant is circulated, and substantially all of the R13 refrigerant is retained as a gas in the upper part of the vessel 6. As a result, the evaporation of R12 in the evaporator 5 causes the refrigeration apparatus to perform in the low temperature mode at 5° F.--4° F. with substantially the same evaporation pressure as that at the time of the super-low temperature mode.

After the ordinary freezing mode, to switch back to the rapid freezing mode the electromagnetic valve 7 is closed which causes the R13 refrigerant which has been retained in the upper part of the vessel 6 to re-enter the refrigeration cycle through the first expansion device 3a.

In this embodiment it is thus possible to obtain a constant refrigeration capability over a relatively wide temperature range by using a heteroazeotropic refrigerant mixture comprising R12 and R13 in the rapid freezing mode, and by using only the R12 refrigerant by isolating the R13 refrigerant in the ordinary freezing mode.

Figure 3:
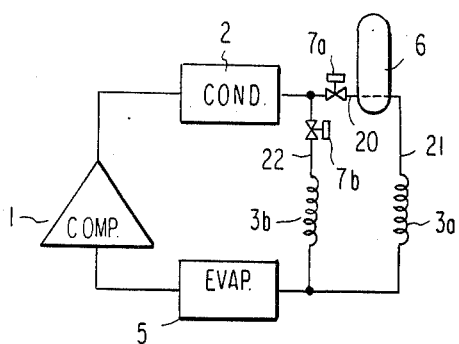
FIGS. 3 and 4 are schematic diagrams showing modified embodiments of FIG. 2.

FIG. 3 shows a modified embodiment of FIG. 2, wherein a first electromagnetic valve 7a is provided at the inlet of the refrigerant vessel 6, and a second electromagnetic valve 7b is provided upstream of the second expansion device 3b. The second valve 7b is opened in the rapid freezing mode (the first valve 7a is closed) and is closed in the ordinary freezing mode (the first valve 7a is opened). As a result, the heteroazeotropic refrigerant mixture flows through the second expansion device 3b in the rapid freezing mode and flows only through the first expansion device 3a in the ordinary freezing mode. This embodiment makes it possible to efficiently separate the two refrigerants R12, R13 and to more easily design the expansion devices because of their selective use in the different modes.

Figure 4:
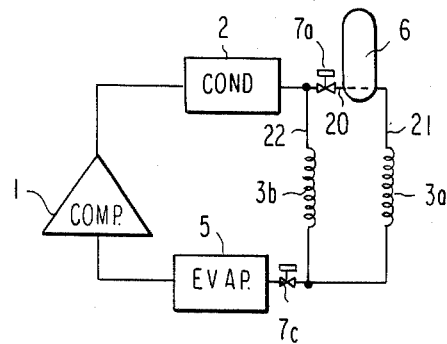

FIG. 4 shows another modification wherein a third electromagnetic valve 7c is provided at the inlet side of the evaporator 5 and is closed when the system is idle. The closing of the valve 7c prevents the refrigerant from flowing into the evaporator 5, and thus maintains the refrigerant at its then state when the apparatus is stopped. An advantage of this embodiment is that it is possible to obtain a stable working of the system when, in particular, the ordinary freezing mode is stopped and then restarted again, because the two refrigerants R12, R13 remain separated from each other. In addition, it prevents the compressor from overloading.

Figure 5:
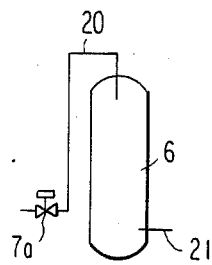
FIGS. 5 and 6 are enlarged sectional views showing modified embodiments of the refrigerant vessel employed in FIGS. 2 through 4.
Figure 6:
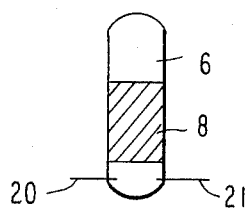

The refrigerant vessel 6 may take other configurations as shown in FIG. 5 and FIG. 6, wherein FIG. 5 shows the pipe 20 inserted into the top part of the vessel instead of the lower part. In FIG. 6 a fractionating filler 8 such as meshes or a number of small balls is packed into the vessel to facilitate the separation of the high and low boiling point refrigerants.

Figure 7:
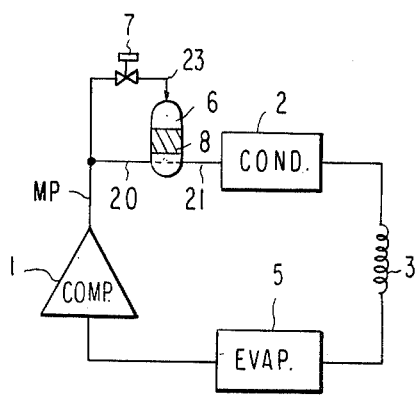
FIGS. 7 through 14 are schematic diagrams showing further embodiments of the system of this invention.

Further embodiments of the invention are shown in FIGS. 7 to 14. In FIG. 7 the refrigerant vessel 6 is inserted between the outlet side of the compressor 1 and the inlet side of the condenser 2. The piping MP extending from the outlet side of the compressor is divided into two pipes 20 and 21 at the lower part of the vessel 6, and the upper part of the vessel is fed by a branch pipe 23 through the valve 7.

In the ordinary freezing mode, with the valve 7 closed, the compressed heteroazeotropic refrigerant mixture flows into the vessel 6 through pipes MP and 20, a part of which flows out through the pipe 21 and is returned to the compressor through the condenser 2, the expansion device 3 and the evaporator 5. The R13 refrigerant fractionated by the filler 8 remains in the upper portion of the vessel 6, and a liquid refrigerant containing primarily R12 flows into the pipe 21 and circulates through the system.

In the rapid freezing mode the valve 7 is opened to cause the refrigerant to flow therethrough, into the vessel 6. As a result, the R13 refrigerant that has been retained at the upper portion of the vessel flows into the pipe 21 and is reintroduced into the system. In this mode, therefore, all of the heteroazeotropic refrigerant mixture comprising R12 and R13 is circulated to perform the super-low temperature cooling (−40° F.--58° F.) with substantially the same evaporative pressure as that at the time of the ordinary freezing mode.

Figure 8:
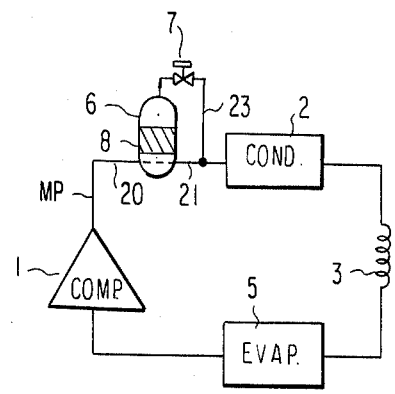

FIG. 8 shows a modification of FIG. 7, wherein the branch pipe 23 is connected between the top portion of the vessel 6 and the pipe 21 through the valve 7. The operation of this configuration is almost the same as that of FIG. 7, except that the R13 refrigerant that has been retained at the upper portion of the vessel 6 flows out through the branch pipe 23 when the valve 7 is opened.

Figure 9:
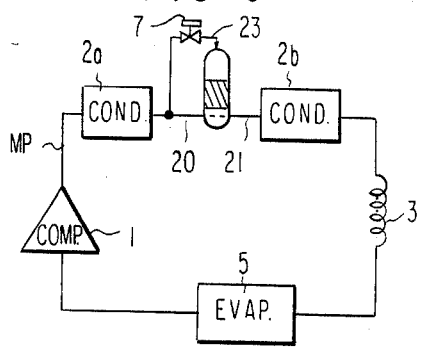
Figure 10:
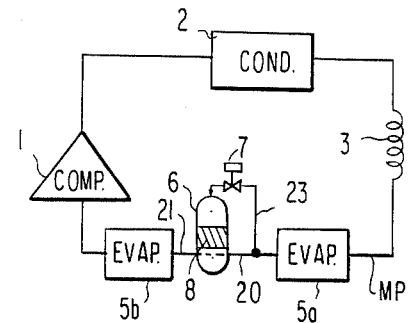
Figure 11:
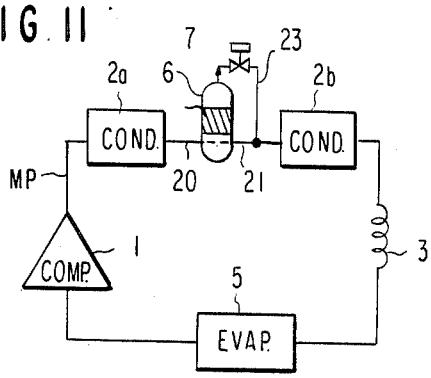
Figure 12:
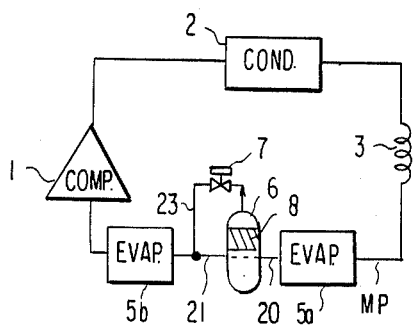

FIGS. 9 through 12 show further modifications. The vessel 6 is inserted between split condenser halves 2a and 2b in FIGS. 9 and 11, or between split evaporator halves 5a and 5b in FIGS. 10 and 12. It is preferable that the vessel 6 be disposed in the neighborhood of the compressor 1 or the expansion device 3 as shown in FIGS. 8, 9 and 11, because the amount of the R13 refrigerant retained in the vessel is inclined to increase owing to the relatively high pressure.

Figure 13:
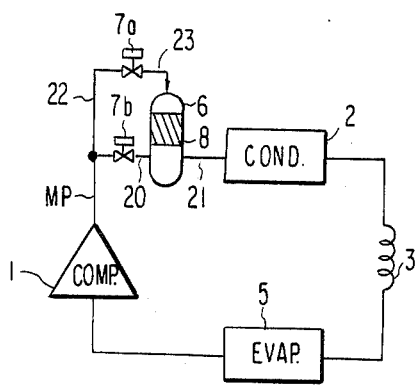
Figure 14:
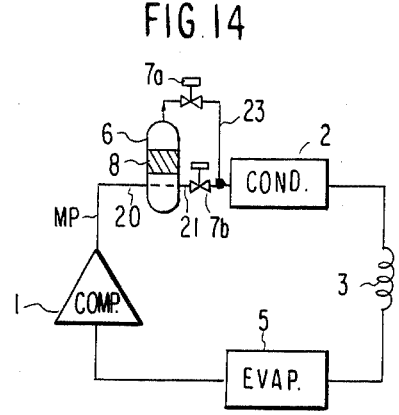

FIGS. 13 and 14 illustrate other embodiments of a system constructed according to the invention in which two valves 7a, 7b are connected in parallel with each other. The first valve 7a is closed in the ordinary freezing mode and opened in the rapid freezing mode, and vice versa for the second valve 7b. In these embodiments it is possible for the R13 refrigerant that has been retained in the vessel 6 to return early to the refrigeration cycle, since the valves 7a, 7b are operated so that all refrigerants from the compressor 1 flow into the vessel 6 in the rapid freezing mode.

Figure 15:
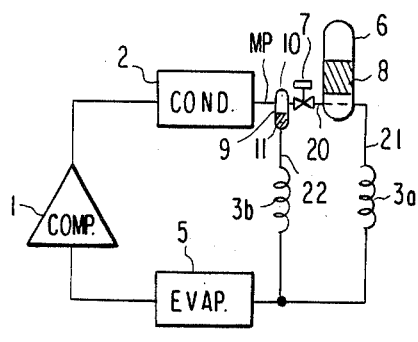
FIGS. 15 through 22 are schematic diagrams showing other embodiments of the invention which employ a gas-liquid separator.
Figure 16:
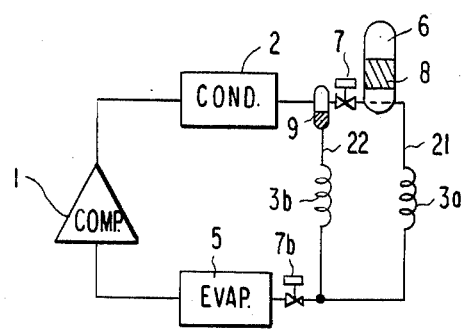

FIGS. 15 through 22 show further embodiments of the invention in which a gas-liquid separator 9 is provided on the outlet side of the compressor 2 for separating the refrigerant mixture into gaseous and liquid components 10, 11 for respective circulation through the first and second expansion devices 3a, 3b. FIGS. 15 and 16 correspond respectively to FIGS. 2 and 4 except for the gas-liquid separator.

Figure 17:
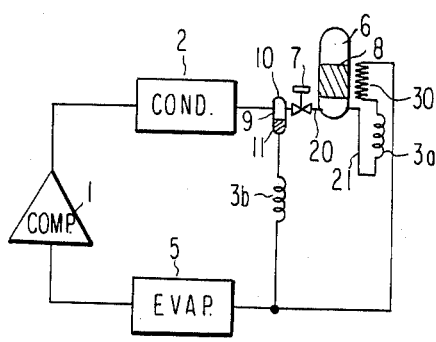
Figure 18:
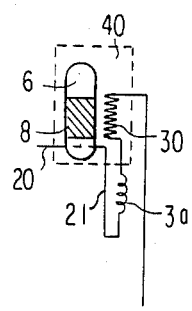

In FIG. 17 a heat exchanger 30 is provided in the outlet pipe from the first expansion device 3a proximate the vessel 6. This results in increasing the consistency of the R13 refrigerant retained in the upper portion of the vessel, because the cooling of the vessel enhances the fractionating of the refrigerant. In FIG. 18 an adiabatic enclosure 40 is provided surrounding both the vessel 6 and the heat exchanger 30 to minimize any heat loss therefrom, whereby the fractionating operation is further enhanced.

Figure 19:
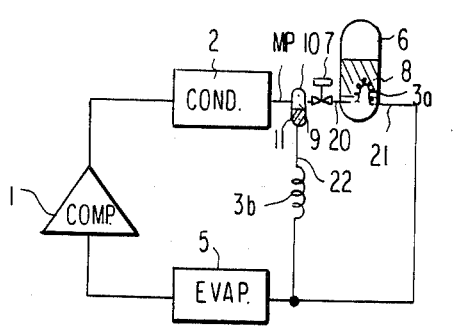
Figure 20:
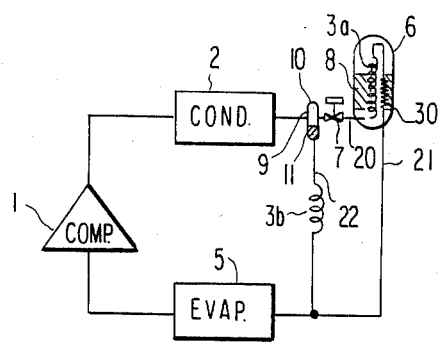
Figure 21:
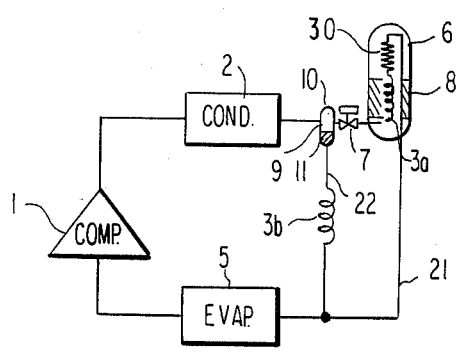
Figure 22:
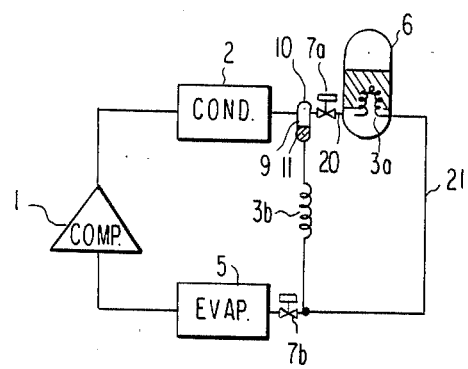

In FIG. 19 the first expansion device 3a is arranged on the pipe 21 within the vessel 6. In FIGS. 20 and 21 the first expansion device 3a and the heat exchanger 30 are arranged to cool the refrigerant in the filler 8 within the vessel 6, which further increases the consistency of the R13 refrigerant. Finally, in FIG. 22 the second valve 7b is disposed at the inlet side of the evaporator 5 and is closed when the system is idle to prevent the refrigerant in the condenser 2 and the vessel 6 from flowing into the evaporator 5. This stabilizes the operation of the system when restarting during the ordinary freezing mode by maintaining the high and low boiling point refrigerants separated, and prevents the overloading of the compressor.

No thermostatic or manual means have been disclosed for selectively controlling the valves 7, 7a, 7b and 7c as these are well known and obvious, and beyond the scope of the invention.

What is claimed is:

1. A dual, discrete mode refrigeration system, comprising: a compressor (1), a condenser (2), expansion means (3) and an evaporator (5) connected in series with each other; a heteroazeotropic refrigerant mixture comprising a high boiling point refrigerant and a low boiling point refrigerant charged into the system, a liquid-gaseous fractionating vessel (6) disposed in a predetermined portion of said system for separating out and retaining the low boiling point refrigerant in a gaseous phase during system operation in an ordinary freezing mode, with both refrigerants circulating through the system during operation in a rapid freezing, super-low temperature mode, an electromagnetic valve (7) mounted in an inlet side of said system for selectively changing the refrigerant path to implement either said rapid freezing mode or said ordinary freezing mode, a fractionating filler (8) disposed within said vessel intermediate upper and lower ends thereof, and a refrigerant pipe (20, 21) leading from an outlet of said valve through said vessel and interrupted within said vessel for circulating both refrigerant therethrough to implement the gaseous phase separation and retentive isolation of the low boiling point refrigerant in the ordinary freezing mode.

2. The system of claim 1, wherein said vessel is mounted between said condenser and said expansion means.

3. The system of claim 1, wherein said heteroazeotropic refrigerant mixture comprises R12 refrigerant whose boiling point is $-22°$ F. and R13 refrigerant whose boiling point is $-114°$ F.

4. The system of claim 3, wherein said expansion means comprises first and second expansion devices (3a, 3b) connected in parallel with each other, said vessel is mounted in an inlet side of said first expansion device, and said electromagnetic valve (7a) is mounted downstream of a branch point leading to the second expansion device.

5. The system of claims 1 or 4, further comprising a gas-liquid separator (9) mounted at an outlet side of said condenser.

6. The system of claim 5, further comprising a heat-exchanger (30) mounted proximate said vessel in an outlet side of said first expansion device.

* * * * *